(12) United States Patent
Song

(10) Patent No.: US 8,781,226 B2
(45) Date of Patent: Jul. 15, 2014

(54) DIGITAL IMAGE PROCESSING APPARATUS FOR RECOGNIZING FIREWORKS, METHOD OF OPERATING THE SAME, AND COMPUTER-READABLE STORAGE MEDIUM

(75) Inventor: Won-seok Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 12/902,231

(22) Filed: Oct. 12, 2010

(65) Prior Publication Data

US 2011/0085731 A1    Apr. 14, 2011

(30) Foreign Application Priority Data

Oct. 13, 2009 (KR) .................. 10-2009-0097441

(51) Int. Cl.
*G06K 9/34* (2006.01)
*G06K 9/00* (2006.01)
*G06K 9/48* (2006.01)
*G06K 9/62* (2006.01)

(52) U.S. Cl.
USPC ........... 382/170; 382/181; 382/199; 382/209; 382/216

(58) Field of Classification Search
USPC .................. 382/170–172, 199, 209, 216
See application file for complete search history.

(56) References Cited

U.S. PATENT DOCUMENTS

| | | | |
|---|---|---|---|
| 6,792,203 B1 * | 9/2004 | Ide et al. | 396/65 |
| 7,355,754 B2 * | 4/2008 | Terashita | 358/2.1 |
| 2003/0197792 A1 * | 10/2003 | Kikuchi | 348/220.1 |
| 2006/0158536 A1 * | 7/2006 | Nakayama | 348/254 |
| 2007/0019094 A1 * | 1/2007 | Silberstein | 348/333.01 |
| 2007/0035778 A1 * | 2/2007 | Yoshizawa et al. | 358/302 |
| 2007/0248330 A1 * | 10/2007 | Pillman et al. | 386/107 |
| 2009/0009622 A1 * | 1/2009 | Yoshida et al. | 348/222.1 |
| 2009/0160968 A1 * | 6/2009 | Prentice et al. | 348/223.1 |
| 2009/0231441 A1 * | 9/2009 | Walker et al. | 348/207.1 |

* cited by examiner

*Primary Examiner* — Matthew Bella
*Assistant Examiner* — Weiwen Yang
(74) *Attorney, Agent, or Firm* — Drinker Biddle & Reath LLP

(57) ABSTRACT

A digital image processing apparatus recognizes an image of a firework and performs image quality processing on the image. The digital image processing apparatus for recognizing a firework may include a digital signal processor (DSP) that recognizes a firework in a scene recognition mode based on data regarding luminance and size of flames of the firework of a live view image including at least two consecutively input frames, and that performs image quality processing on the live view image.

19 Claims, 7 Drawing Sheets

INPUT IMAGE

HISTOGRAM DISTRIBUTION

LARGE FLAMES

SMALL FLAMES

DIGITAL IMAGE PROCESSING APPARATUS FOR RECOGNIZING FIREWORKS, METHOD OF OPERATING THE SAME, AND COMPUTER-READABLE STORAGE MEDIUM

CROSS-REFERENCE TO RELATED PATENT APPLICATION

This application claims the priority benefit of Korean Patent Application No. 10-2009-0097441, filed on Oct. 13, 2009, in the Korean Intellectual Property Office, the disclosure of which is incorporated herein in its entirety by reference.

BACKGROUND

1. Field of the Invention

The present invention relates to a digital image processing apparatus that recognizes fireworks and performs image quality processing according to the fireworks, a method of operating the digital image processing apparatus, and a computer-readable storage medium for storing a program thereon for executing of the method.

2. Description of the Related Art

In order to obtain the highest image quality, even when the user is not skilled at manipulating an electronic device, a scene recognition mode is included in general digital image processing apparatuses. Accordingly, without manipulation by the user, one of these digital image processing apparatuses recognizes a currently viewed scene and performs image quality processing according to the recognized scene.

To photograph fireworks, an automatic digital image processing apparatus performs photographing when a firework recognition mode is selected as a scene recognition mode. During the photographing operation, exposure for 2-4 seconds is automatically set. A manual image processing apparatus photographs fireworks after the user sees the fireworks burn with colored flames and sparks by using a bulb shutter at a time point when the sparks rise up while having an aperture tightened as much as possible. The fireworks are photographed at night, and thus a good quality image may be obtained by setting the international standards organization (ISO) sensitivity at 200 to reduce noise and by only adjusting a shutter speed.

However, even when the user has set up an appropriate photographing condition for the fireworks, the user must have photographing experience to properly photograph the fireworks. For example, even when using the bulb shutter, exposure of 3-5 seconds is sufficient for bright fireworks, but for darker fireworks, exposure of 15-30 seconds is needed. Also, in the case of a long exposure, it is likely that the exposure may be excessively long due to several fireworks sparking at the same positions. While there is no exact solution for the photographing of fireworks, the exposure time needs to be empirically adjustable according the size, luminance, and track of the flames.

However, it is difficult for users who are not skilled at operating the digital image processing apparatus to adjust the exposure time as described above. Also, typically, the exposure time of the firework recognition mode of the scene recognition mode is fixed, and thus the size, luminance, and track of the fireworks are not considered during a photographing operation. Accordingly, too dark of an image, as illustrated in FIG. 9A, or too bright of an image, as illustrated in FIG. 9B, may be captured.

SUMMARY

Embodiments of the present invention include a digital image processing apparatus that recognizes a firework from an image to be captured even though the user does not select a firework recognition mode of a scene recognition mode, and that performs image quality processing that is appropriate for the firework, on the image.

Embodiments of the present invention also include a method of operating the digital image processing apparatus, and a computer-readable storage medium having stored thereon a program executable by a processor for executing the method.

According to an aspect of the present invention, a digital image processing apparatus comprises a digital signal processor that recognizes a firework in a scene recognition mode based on data regarding luminance and size of flames of the firework of a live view image including at least two consecutively input frames, and that performs image quality processing on the live view image.

The digital signal processor may display a user interface that is displayed variously according to luminance and size of the flames based on a result of recognizing a firework.

The digital signal processor may comprise: a window setting unit that sets windows on predetermined portions of the live view image corresponding to a reference luminance or greater, and generates position data and luminance data of the set windows; a histogram calculation unit that calculates histograms of the live view image based on the position data and luminance data of the set windows; a probability calculation unit that calculates a probability that the live view image is a fireworks image based on variations of the calculated histograms; a pattern recognition unit that recognizes a pattern by determining whether a distribution of the calculated probability is similar to a pattern obtained by photographing a fireworks display; and a control unit that determines a firework recognition mode based on a result of recognizing the pattern, and performing image quality processing on the fireworks image according to whether the use of a tripod is recognized or not.

The digital image processing apparatus may further comprise a memory that stores luminance data and position data of the set windows, the calculated histograms, and a reference pattern that is a reference for recognizing the firework.

The window setting unit may comprise: a calculation unit that calculates a total luminance based on luminance data of a first frame, and sets a reference luminance corresponding to a predetermined distribution of the calculated total luminance; and a setting unit that sets windows by dividing pixels into blocks corresponding to the reference luminance or greater with respect to subsequent frames after the first frame.

The histogram calculation unit may comprise: a calculation unit that calculates sums of histograms of luminance of pixels in blocks that correspond to a reference value or greater among the total frames corresponding to the positions of the windows of the first frame; and a smoothing unit that smoothes each of the frames with a size corresponding to a difference between a maximum value and a minimum value of the calculated sums of the histograms of the luminance.

The probability calculation unit may comprise: a setting unit that sets a reference variation for determining a variation based on sums of the histograms of the first frame; a first calculation unit that calculates variations of the sums of the histograms between adjacent frames of the total frames; and a second calculation unit that calculates the calculated variations that are the same as or greater than the reference variation for each of the windows as a probability.

The pattern recognition unit may comprise: a providing unit that provides the reference pattern for recognizing the firework; a generating unit that generates a pattern based on the calculated probability; and a comparing unit that compares the generated pattern with the reference pattern.

When the use of a tripod is not recognized, the control unit may perform image quality processing on the image that is recognized in a firework recognition mode when the reference pattern is similar to the generated pattern, by adjusting at least one of the shutter speed and ISO.

When the use of a tripod is recognized, the control unit may perform image quality processing on the image that is recognized in a firework recognition mode, by adjusting at least one of the shutter speed and ISO by determining the luminance of flames based on the number of windows and the sizes of flames based on the histograms.

According to another aspect of the present invention, a method of operating a digital image processing apparatus comprises: recognizing a fireworks image in a scene recognition mode based on variations of luminance and sizes of flames of a live view image including at least two consecutively input frames; and performing image quality processing on the image that is recognized as a fireworks image.

Recognizing a fireworks image may comprise: (a) setting windows to predetermined portions of the live view image corresponding to a reference luminance or greater and generating position data and luminance data of the set windows; (b) calculating histograms of the live view image based on the position data and luminance data of the set windows; (c) calculating a probability that the live view image is a fireworks image based on variations of the calculated histograms; and (d) determining whether a distribution of the calculated probability is similar to a pattern that is obtained by photographing a firework.

Performing image quality processing may comprise: (e) determining whether a tripod is used or not; (f) if the use of a tripod is not recognized, performing image processing with a previously set shutter speed and ISO; and (g) if the use of a tripod is recognized, determining luminance of flames based on a number of the windows, determining a size of the flames based on the histograms, and adjusting at least one of the shutter speed and ISO to perform image quality processing.

The step of (a) setting windows may comprise: (a-1) calculating a total luminance based on luminance data of a first frame, and setting a reference luminance corresponding to a predetermined distribution of the calculated total luminance; and (a-2) setting windows by dividing pixels into blocks corresponding to the reference luminance or greater with respect to subsequent frames after the first frame.

The step of (b) calculating histograms may comprise: (b-1) calculating sums of histograms of luminance of pixels in blocks that correspond to a reference value or greater among the total frames corresponding to the positions of windows of the first frame; and (b-2) smoothing each of the frames with a size corresponding to a difference between a maximum value and a minimum value of the calculated histograms of the luminance.

The step of (c) calculating a probability may comprise: (c-1) setting a reference for determining a variation based on sums of the histograms of the first frame; (c-2) calculating variations of the sums of the histograms between adjacent frames of the total frames; and (c-3) calculating the calculated variations that are the same as or greater than a reference for each of the windows, as a probability.

The step of (d) determining may comprise: (d-1) providing a reference pattern for recognizing the firework; (d-2) generating a pattern based on the calculated probability; and (d-3) comparing the generated pattern with the reference pattern.

According to another aspect of the present invention, a computer-readable storage medium may have stored thereon a program executable by a processor for performing a method comprising: recognizing a firework in a scene recognition mode based on variations of luminance and sizes of flames of a live view image including at least two consecutively input frames, and performing image quality processing on the live view image.

The method may further comprise: setting windows on predetermined portions of the live view image corresponding to a reference luminance or greater and generating position data and luminance data of the set windows; calculating histograms of the live view image based on the position data and luminance data of the set windows; calculating a probability that the live view image is a fireworks display based on variations of the calculated histograms; recognizing a pattern by determining whether a distribution of the calculated probability is similar to a pattern obtained by photographing a fireworks display; and determining a firework recognition mode based on a result of recognizing the pattern, and performing image quality processing on the image according to whether the use of a tripod is recognized or not.

As described above, according to the present invention, as a firework is automatically recognized, the user does not have to switch to a photographing mode or change a predetermined setup value of the digital image processing apparatus. A setup value of the digital image processing apparatus is automatically adjusted to support a photographing condition so that the firework is properly photographed.

Instead of a passive photographing operation of a scene recognition mode according to the conventional art, a photographing operation is actively conducted such that a setup value is automatically adjusted according to the size or luminance of fireworks, thereby obtaining a good quality image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

The present invention will now be described more fully with reference to the accompanying drawings, in which exemplary embodiments of the invention are shown to thoroughly understand the operational advantages of the present invention. Elements that are well known to one of ordinary skill in the art may be omitted. The invention should not be construed as being limited to the embodiments set forth herein; rather, these embodiments are provided so that this disclosure will be thorough and complete, and will fully convey the concept of the invention to those of ordinary skill in the art. The terminology used herein should be understood as meanings and concepts in conformity with the technical spirit and scope of the present invention to best describe the embodiments of the present invention.

Figure 1:
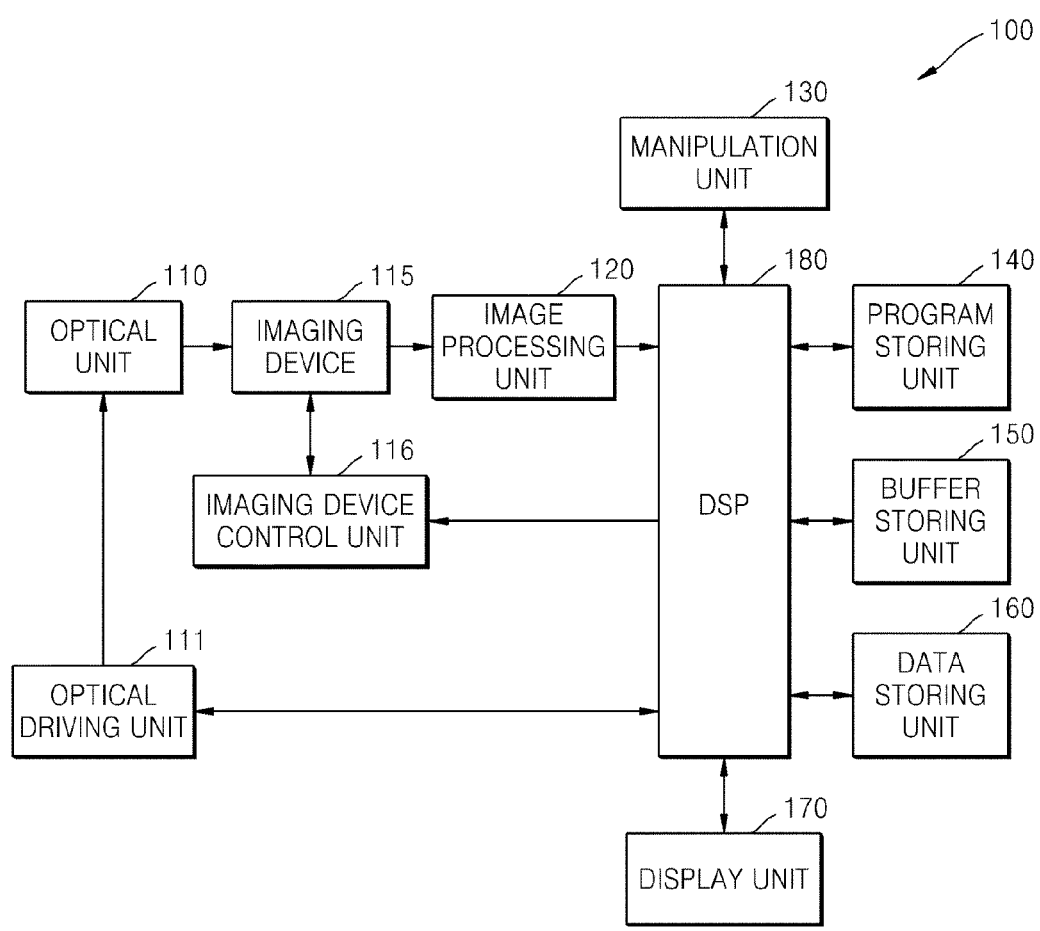
FIG. 1 is a block diagram of a digital image processing apparatus that recognizes a firework, according to an embodiment of the present invention.

FIG. 1 is a block diagram of a digital image processing apparatus 100 that recognizes a firework, according to an embodiment of the present invention.

Figure 2:
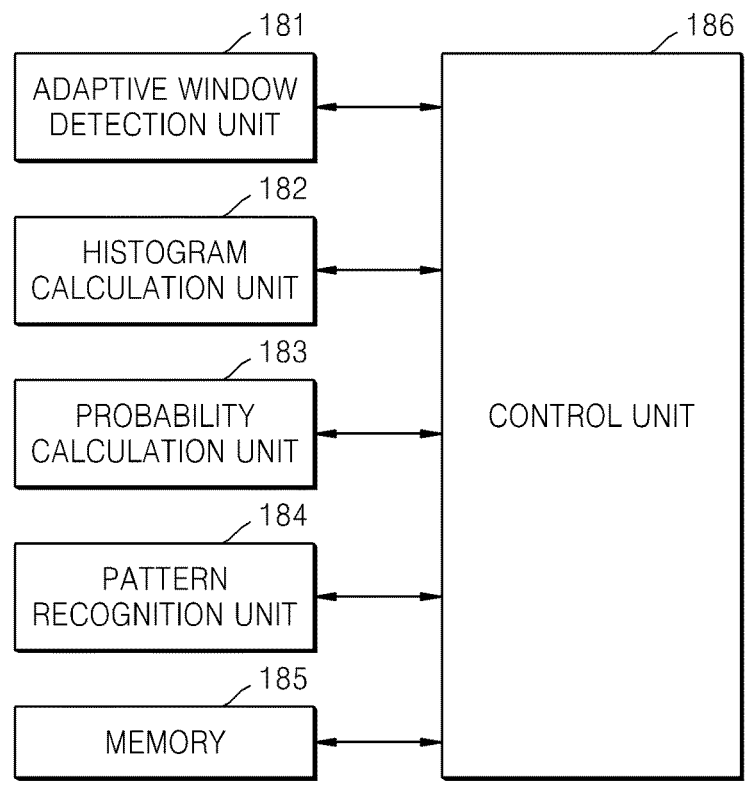
FIG. 2 is a detailed block diagram of a digital signal processor (DSP) of FIG. 1, according to an embodiment of the present invention.

FIG. 2 is a detailed block diagram of a digital signal processor (DSP) 180 of FIG. 1, according to an embodiment of the present invention. The digital image processing apparatus 100 includes an optical unit 110, an optical driving unit 111, an imaging device 115, an imaging device control unit 116, an image processing unit 120, a manipulation unit 130, a program storing unit 140, a buffer storing unit 150, a data storing unit 160, a display unit 170, and the digital signal processor (DSP) 180.

The optical driving unit 111 controls a position of a lens or opening and closing of an aperture. A focal point may be adjusted by moving the position of the lens. Also, a light amount may be adjusted by controlling the opening or closing of the aperture. The optical driving unit 111 may control the optical unit 110 according to a control signal that is automatically generated according to an image signal that is input in real-time or a control signal that is manually input by manipulation of the user.

An optical signal transmitted from the optical unit 110 arrives at a light receiving surface of the imaging device 115 to form an image of a subject on the light receiving surface. The imaging device 115 may include a charge-coupled device (CCD) or a complementary metal-oxide semiconductor image sensor (CMOS) for converting an optical signal into an electrical signal. The sensitivity of the imaging device 115 may be adjusted by the imaging device control unit 116. The imaging device control unit 116 may control the imaging device 115 according to a control signal that is automatically generated by an image signal that is input in real-time or a control signal that is manually input by manipulation of the user.

The image processing unit 120 performs signal processing on digital RAW data output by the imaging device 115 to be displayable. The image processing unit 120 removes a black level caused due to a dark current generated in a CCD or a CMOS which are sensitive to a temperature change, and performs gamma correction for encoding data according to the non-linearity of human sight. The image processing unit 120 performs color filter array (CFA) interpolation in which a Bayer pattern realized as a RGRG line and a GBGB line of predetermined gamma-corrected data is interpolated to a RGB line. The image processing unit 120 converts an interpolated RGB signal into a YUV signal, performs edge compensation, by which a Y signal is filtered using a high band pass filter to make an image more distinct, and color correction, by which color values of U and V signals are corrected by using standard color coordinates, and removes noise of the signals. The image processing unit 120 compresses the Y, U, and V signals from which noise is removed, and performs signal processing thereon, to create a JPEG file. The created JPEG file is displayed on the display unit 170 and is stored in the data storing unit 160 according to selection by the user. All of the operations of the image processing unit 120 are performed under the control of the DSP 180.

A control signal from the outside, for example, from a user, may be input through the manipulation unit 130. The manipulation unit 130 includes a shutter-release button for capturing an image by exposing the imaging device 115 to light for a predetermined period of time, a power button for supplying power, a wide angle-zoom button and a telephoto-zoom button that either widens or narrows a view angle according to an input, and various functional buttons such as a character input button, a mode selection button such as a photographing mode or a replay mode, a white balance setup function button, an exposure setup function button, etc. The manipulation unit 130 may include various buttons as described above, or may include any form through which the user can input information such as a keyboard, a touch pad, a touch screen, a remote controller, or the like.

Also, the digital image processing apparatus 100 includes the program storing unit 140 for storing programs such as an operating system or an application system for driving the digital image processing apparatus 100, the buffer storing unit 150 for temporarily storing resultant data needed for calculation, and the data storing unit 160 for storing various information such as image files including image signals needed for the stored programs.

In addition, the digital image processing apparatus 100 includes the display unit 170 for displaying an operational status thereof or image data obtained by the digital image processing apparatus 100. The display unit 170 may provide visual data and/or audio data to the user. In order to provide visual data, the display unit 170 may include, for example, a liquid crystal display (LCD), an organic light emitting diode (OLED) display, or an electrophoretic display (EPD) display.

In addition, the digital image processing apparatus 100 includes the DSP 180 for processing an input image signal. The DSP 180 also controls each of the above-described elements of the digital image processing apparatus 100 according to the processed image signal or an external input signal. As illustrated in FIG. 2, the DSP 180 may include an adaptive window detection unit 181, a histogram calculation unit 182, a probability calculation unit 183, a pattern recognition unit 184, a memory 185, and a control unit 186. Alternatively, the adaptive window detection unit 181, the histogram calculation unit 182, the probability calculation unit 183, the pattern recognition unit 184, the memory 185, and the control unit 186 may be separate units outside the DSP 180, instead of being included in the DSP 180, and operations thereof will be described later.

Hereinafter, the function of the DSP 180 to perform a firework recognition mode of a scene recognition mode and image quality processing according to the firework recognition mode will be described with reference to FIGS. 2 through 8.

A firework as discussed herein is assumed to have the following characteristics.
1. The firework is lit only at night.
2. The firework is lit up in the sky.
3. The firework has various colors, positions, shapes, and luminance.
4. The firework sparks and then subsides.

In addition, it may be assumed that it is difficult to photograph a firework without a tripod.

The DSP 180 recognizes a firework in a scene recognition mode according to a variation in the luminance of a live view image including at least two frames that are sequentially input, and performs image quality processing on the live view image.

To this end, the DSP 180 includes the adaptive window detection unit 181, the histogram calculation unit 182, the probability calculation unit 183, the pattern recognition unit 184, the memory 185, and the control unit 186 as described above.

For a live view image at daytime, 30 frames are generated per second, and at nighttime, 15 frames are generated per second. A firework is usually fired at night, and thus 15 frames are generated per second when photographing the firework. In the present specification, five consecutive frames—$1^{st}$ through $5^{th}$ frames—are regarded as one period for convenience of description. However, one period is not limited to including five consecutive frames, and may also include at least two consecutive frames.

In addition, flames of the firework have various colors, and thus luminance (Y) data obtained from the image processing unit 120 is used in a firework recognition mode.

The adaptive window detection unit 181 sets adaptive windows for recognizing a firework by detecting luminance from the $1^{st}$ through $5^{th}$ frames of one period obtained from a live view image, and generates position data, number data, and luminance data, and stores the same in the memory 185.

Figure 3A:
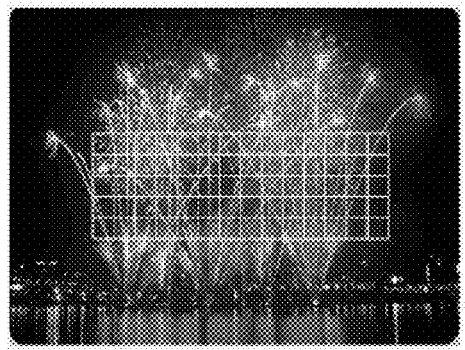
FIGS. 3A through 3D are exemplary photographic images for explaining an operation of setting adaptive windows using an adaptive window detection unit illustrated in FIG. 2.
Figure 3B:
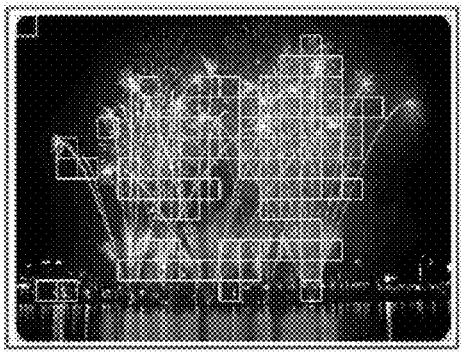
Figure 3C:
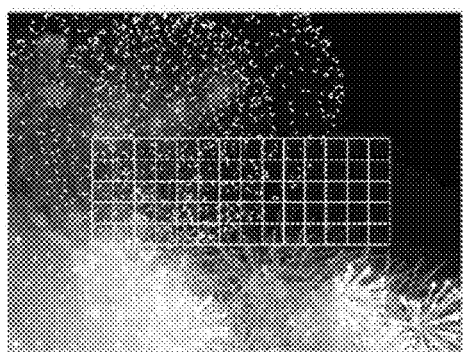
Figure 3D:
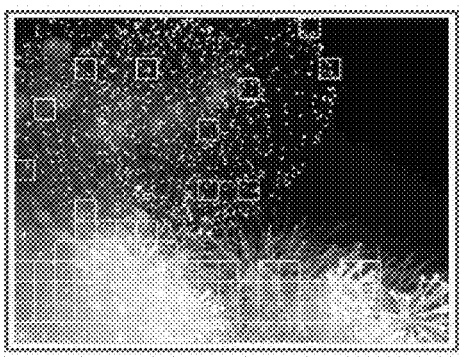

FIGS. 3A through 3D are exemplary photographic images for explaining an operation of setting adaptive windows using an adaptive window detection unit 181 illustrated in FIG. 2. First, luminance data of a $1^{st}$ frame image is determined as total luminance, and a reference luminance, for example, 90% of the total luminance is set. When the reference luminance is set, adaptive windows for pixels corresponding to the reference luminance or greater are set to the $1^{st}$ through $5^{th}$ frames. FIGS. 3A and 3C illustrate adaptive windows that are set at predetermined positions regardless of the sizes and luminance of flames of the firework. In this case, various forms of the firework cannot be managed, and thus problems occur in terms of the recognition ratio. Accordingly, as shown in FIGS. 3B and 3D, adaptive windows are set to points where flames spark, that is, to positions where luminance is greater than the reference luminance.

Next, necessary data is obtained from $2^{nd}$ through $5^{th}$ frames from positions corresponding to adaptive windows that are set to the $1^{st}$ frame. The adaptive windows are changed every period, that is, every one period including the $1^{st}$ through $5^{th}$ frames.

Figure 4:
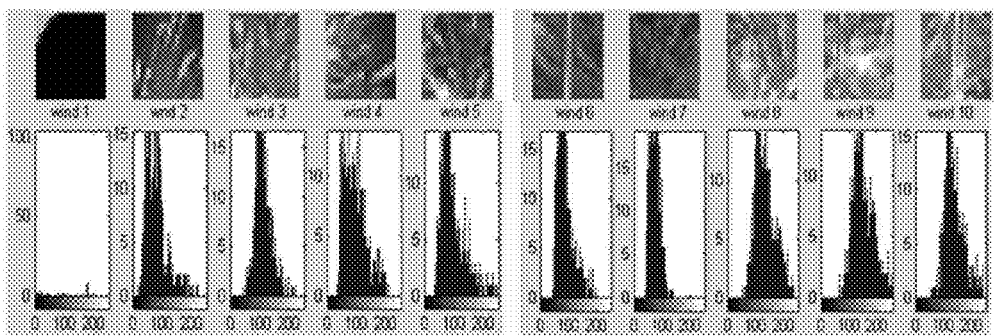
FIG. 4 is an exemplary view for explaining calculation of histograms using a histogram calculation unit illustrated in FIG. 2.

FIG. 4 is an exemplary view for explaining calculation of histograms using a histogram calculation unit 182 illustrated in FIG. 2. The histogram calculation unit 182 calculates a sum of histograms of each frame by using the position data and the number data of windows obtained by the adaptive window detection unit 181 and performs smoothing with respect to the luminance of the frames.

The histogram calculation unit 182 calculates a sum of histograms with respect to pixels (luminance) within a block that are greater than a reference value among the $1^{st}$ through $5^{th}$ frames corresponding to window positions of the The sum of the calculated histograms is stored in the memory 185.

Limits of the size and luminance of flames are determined according to a selected reference value. Accordingly, as the limits are set, the number of calculations by the histogram calculation unit 182 is significantly reduced to thereby reduce the load of operations of a system. FIG. 4 illustrates distributions of histograms shown with respect to windows. By using the distribution of the histograms, a reference value may be set.

A firework is progressive, and thus the sum of histograms calculated regarding luminance data per frame may not be directly used. For example, if a flame sparks at a $1^{st}$ frame, and then five flames spark since a $3^{rd}$ frame, luminance of the flames may not be compared directly unless a reference value is adjusted with respect to the luminance. Accordingly, smoothing is performed on the luminance for each frame with a size corresponding to a difference between a maximum value and a minimum value of the luminance of each of the frames. The smoothing is conducted according to Equation 1 below.

$$\mathrm{Norm\_Hist}_i^{no.Y} = \frac{|\mathrm{hist}_{max}^{no.Y} - \mathrm{hist}_i^{no.Y}|}{\mathrm{hist}_{max}^{no.Y} - \mathrm{hist}_{min}^{no.Y}} * 100, \qquad [\text{Equation 1}]$$

$$(i = 1, 2, 3 \ldots n)$$

In Equation 1, a superscript no. Y denotes the number of frames, and a subscript i denotes a window.

The probability calculation unit 183 calculates a probability that a scene of a current live view image is a fireworks display by using a result obtained by the histogram calculation unit 182.

In the memory 185, the sum of histograms according to the windows set to one period of frames, that is, the $1^{st}$ through $5^{th}$ frames, are stored.

The probability calculation unit 183 sets a reference variation for determining a variation according to the distribution of the sums of histograms of the $1^{st}$ frame. Then, variations between the $1^{st}$ frame and the $2^{nd}$ frame, between the $2^{nd}$ frame and $3^{rd}$ frame, between the $3^{rd}$ frame and the $4^{th}$ frame, and between the $4^{th}$ frame and the $5^{th}$ frame are calculated. Then, the calculated variations that are the same as or greater than the reference variation for each of the windows is calculated as a probability P.

When a histogram variation, that is, a luminance variation, is great, a high probability is calculated, and when a luminance variation is small, a low probability is calculated. The probability calculation unit 183 calculates one probability from the frames of one period.

Figure 5:
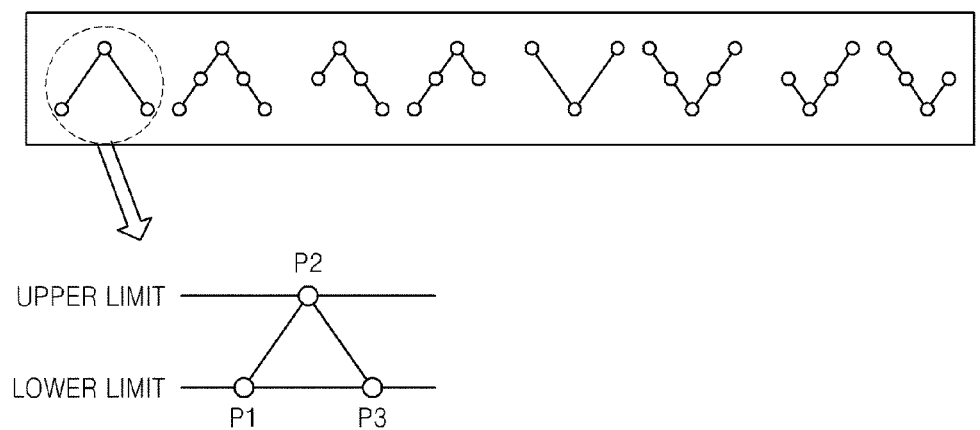
FIG. 5 is an exemplary view for explaining pattern recognition using a pattern recognition unit illustrated in FIG. 2.

FIG. 5 is an exemplary view for explaining pattern recognition using a pattern recognition unit 184 illustrated in FIG. 2. The pattern recognition unit 184 determines whether the distribution of probabilities obtained by the probability calculation unit 183 is identical to a pattern that can be obtained by photographing a firework. A firework may be recognized without the pattern recognition unit 184 by using only a result of the probability calculation unit 183; however, the pattern recognition unit 184 may improve the performance of recognizing a firework. When a luminance variation is large, a probability is high. However, when the digital image processing apparatus 100 is moved by the user or a hand shake occurs under a night view photographing condition, a luminance variation regarding the windows is increased, which increases the probability. This frequently occurs, and may cause a wrong recognition of a firework.

By using the characteristics that a firework sparks and then vanishes, the pattern recognition unit 184 uses reference patterns that are defined as a firework, as shown in FIG. 5, and stored in the memory 185. The reference patterns are expressions of probabilities of a firework according to time flow. In a first reference pattern illustrated in FIG. 5, probabilities P1, P2, and P3 are expressed according to time flow. The probability P1 denotes a probability calculated from frames of a first period, the probability P2 denotes a probability calculated from frames of a second period, and the probability P3 denotes a probability calculated from frames of a third period. An upper limit and a lower limit are set for each of the reference patterns.

The pattern recognition unit 184 generates a current pattern of the photographed firework based on probabilities P obtained by the probability calculation unit 183, compares the current pattern with the reference pattern, and if the current pattern is similar to the reference pattern and has a probability over an upper limit of the reference pattern or a probability less than a lower limit of the reference pattern, recognizes the current pattern as a firework.

The control unit 186 controls each of the units of the DSP 180, and performs image quality processing on a fireworks image according to a recognition result of the pattern recognition unit 184 and according to whether the use of a tripod is recognized or not.

FIGS. 6A through 6D are exemplary views for explaining image quality processing according to a firework recognition mode. In general, when a firework recognition mode is selected as a scene recognition mode, the control unit 186 performs image quality processing under the conditions such as a shutter speed of 2 seconds, ISO of 160, a small aperture, and a focal distance of infinite. However, according to the current embodiment of the present invention, after recognizing a firework in the scene recognition mode, detailed image quality processing is performed according to whether the use of a tripod is recognized or not.

When the use of a tripod is not recognized, the control unit 186 performs a normal image quality processing as described above because a shutter speed according to the firework recognition mode cannot be applied, in order to reduce blurring caused by handshaking.

However, when the use of a tripod is recognized, noise is minimized by reducing ISO as much as possible in order to properly capture a fireworks image. Also, image quality processing is performed variously based on the number of windows and histogram reference values obtained in the firework recognition mode.

The number of windows denotes the number of effective windows that are to be calculated for obtaining firework data in the whole image. For example, if the number of effective windows is assumed to be 40 among 50 windows, a size of the current firework is 80% (40/50×100).

The histogram reference values may denote luminance corresponding to 90% among the distribution of the histogram. For example, in an input image of FIG. 6A, a reference value of a histogram shown in FIG. 6B based on 8 bits is about 100. Thus, it can be seen that the luminance of the firework is 39% (100/256×100).

Figure 6A:
FIGS. 6A through 6D are exemplary views for explaining image quality processing according to a firework recognition mode.
Figure 6B:
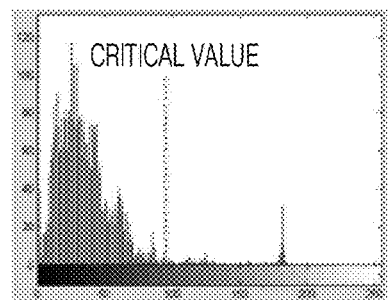
Figure 6C:
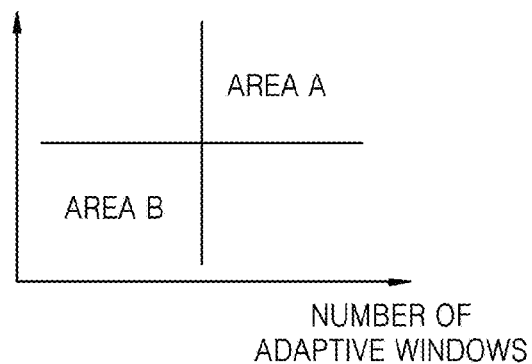

FIG. 6C is a graph showing data obtained by recognizing the firework. Area A indicates areas of a live view image that include a bright and large firework. Area B indicates areas of a live view image that include a less bright and small firework. Based on the data of the areas, image quality processing may be performed as shown in FIG. 6D.

Figure 6D:
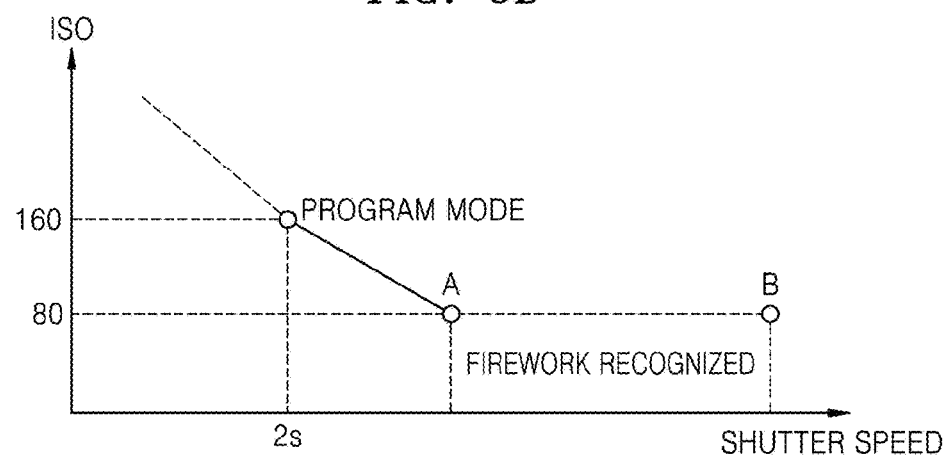

Referring to FIG. 6D, image quality processing is performed with respect to a normal scene recognition mode under the conditions such as a shutter speed of 2 seconds, and ISO of 160. When a scene recognition mode is selected, since no data regarding a firework is given, the shutter speed and ISO are fixed. In this case, whether a tripod is used or not may not be recognized, and thus the shutter speed may not be increased, and the shutter speed is adjusted within a range in which the image is not blurred as much as possible. A fireworks display is properly photographed usually by photographing a trace of the firework by increasing the shutter speed. Here, however, the trace of the firework may not be photographed because the shutter speed may not be increased.

However, if the fireworks display is first recognized and then image quality thereof is processed, photographing of the trace of the firework is supported in more detail based on data regarding the size and luminance of the firework than in the conventional art. For example, referring to FIG. 6D, the control unit 186 may adjust conditions to ones where a shutter speed is [area A]–[area B], ISO is 80, a small aperture is used, and a focal distance is infinite, to support capturing of a fireworks image having high image quality.

Figure 7A:
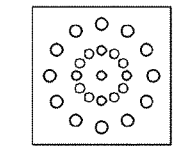
FIGS. 7A and 7B illustrate exemplary user interfaces that are displayable according to results of a firework recognition mode.
Figure 7B:
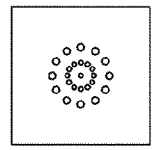

FIGS. 7A and 7B illustrate exemplary user interfaces that are displayable according to results of a firework recognition mode. According to another embodiment of the present invention, the control unit 186 may display on the display unit 170 a representation such as an icon of a large firework as illustrated in FIG. 7A or a small firework as illustrated in FIG. 7B based on data regarding luminance and size of the firework obtained from the $1^{st}$ frame.

Figure 8:
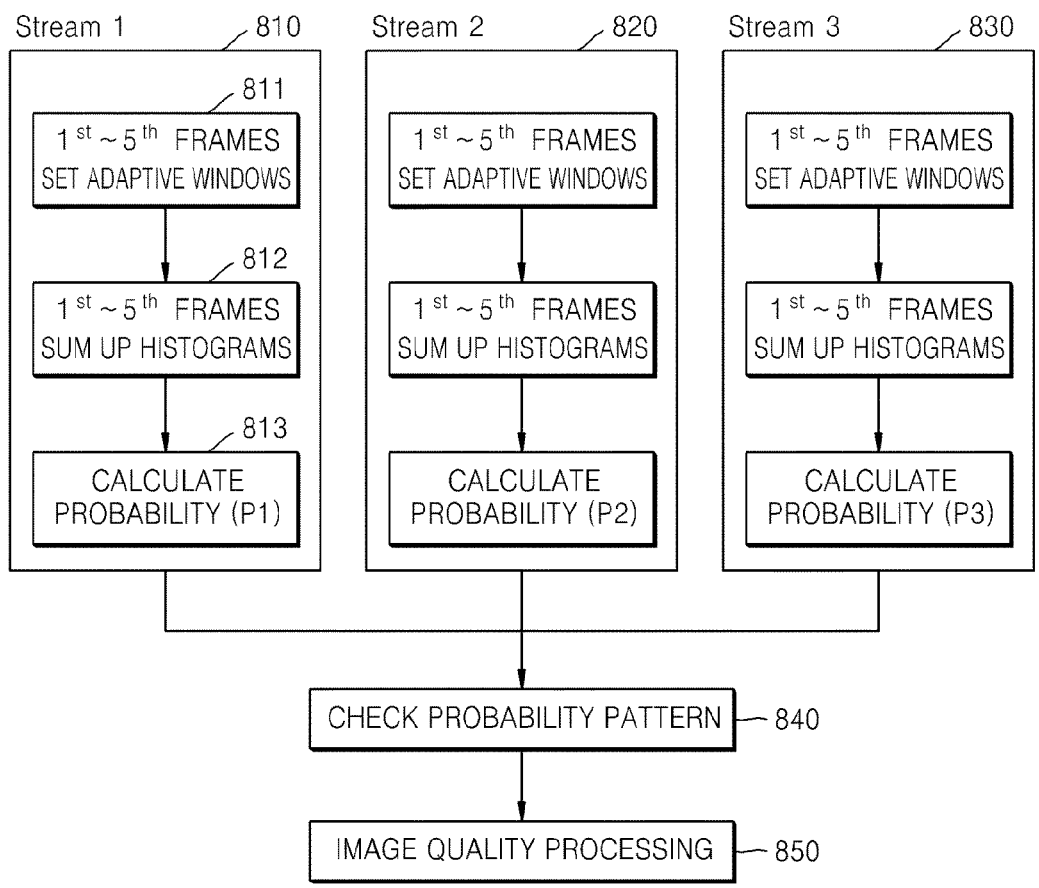
FIG. 8 is a flowchart illustrating a method of operating a digital image processing apparatus that recognizes a firework, according to an embodiment of the present invention.
Figure 9A:
FIGS. 9A and 9B illustrate exemplary images photographed according to results of recognizing fireworks according to the conventional art.
Figure 9B:
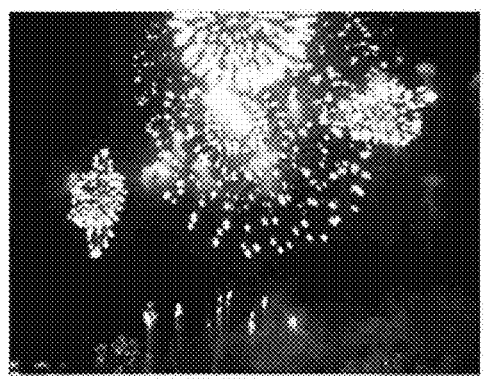

Hereinafter, a method of operating the digital image photographing apparatus capable of recognizing a firework, according to an embodiment of the present invention, will be described in detail with reference to FIG. 8. FIG. 8 is a flowchart illustrating the method of operating a digital image processing apparatus that recognizes a firework, according to an embodiment of the present invention. The method may be performed by the digital image photographing apparatus 100 illustrated in FIG. 1. According to embodiments, the main algorithms of the method may be performed in the DSP 180 with the assistance of peripheral elements of the digital image photographing apparatus 100 illustrated in FIG. 1.

As described above, at nighttime, a live view image including 15 frames per second is formed. Five consecutive frames, $1^{st}$ through $5^{th}$ frames, are set as one period, and this one period is set as a stream.

In operation 810, the DSP 180 sets adaptive windows with respect to a stream 1 ($1^{st}$ through $5^{th}$ frames), calculates sums of histograms, and calculates probabilities that the live view image may be a fireworks display.

In operation 820, the DSP 180 sets adaptive windows with respect to a stream 2 (next $1^{st}$ through $5^{th}$ frames), calculates sums of histograms, and calculates probabilities that the live view image may be a fireworks display.

In operation 830, the DSP 180 sets adaptive windows with respect to a stream 3 (next $1^{st}$ through $5^{th}$ frames after the frames of operation 820), calculates sums of histograms, and calculates probabilities that the live view image may be a fireworks display.

In the present embodiment, streams 1 through 3 are described for convenience of description; streams 4 and 5 and so forth may also be described.

Operations for the streams 2 and 3 are the same as those for the stream 1, and thus here, the operation for the stream 1 will only be described.

The DSP 180 determines luminance data of a first frame image as total luminance, and sets a reference luminance, for example, 90% of the total luminance. In operation 811, when the reference luminance is set, windows are set to pixels corresponding to the reference luminance or greater among the $1^{st}$ through $5^{th}$ frames.

In operation 812, when the windows are set completely, the DSP 180 calculates a sum of histograms with respect to pixels (luminance) in blocks that have reference values or greater among the $1^{st}$ through $5^{th}$ frames corresponding to positions of windows of the $1^{st}$ frame.

A firework is progressive, and thus the sum of the histograms calculated regarding luminance data per frame may not be directly used. For example, if a flame sparks at a $1^{st}$ frame, and then five flames spark since a $3^{rd}$ frame, luminance of the flames may not be compared directly unless a reference value is adjusted with respect to the luminance. Accordingly, smoothing is performed on the luminance for each frame with a size corresponding to a difference between a maximum value and a minimum value of the luminance of each of the frames.

Next, the DSP 180 sets a reference variation for determining a variation according to the distribution of the sums of histograms of the $1^{st}$ frame. Then, the calculated variations that are the same as or greater than the reference variation for each of the windows is calculated as a probability P1 in operation 813. A probability P2 regarding the stream 2 and a probability P3 regarding the stream 3 are calculated in the same manner.

When the probabilities P1, P2, and P3 are calculated, the DSP 180 determines whether a distribution of calculated probabilities is similar as that of a pattern that can be obtained by photographing a firework in operation 840. The DSP 180 uses a reference pattern that may be defined as a fireworks display by using the characteristics of a firework that flames thereof spark once and then vanish. The DSP 180 generates a current pattern based on the probabilities P1, P2, and P3 obtained by calculation, compares the current pattern with the reference pattern, and recognizes a pattern that is similar as the reference pattern and has a probability that is over an upper limit of the reference pattern or a probability that is below a lower limit of the reference pattern.

In operation 850, the DSP 180 performs image quality processing on the firework based on a result of pattern recognition and according to whether the use of a tripod is recognized.

If the use of a tripod is not recognized, the DSP 180 performs a normal image quality processing as described above without applying a shutter speed for a firework recognition mode in order to reduce blurring caused by handshaking. However, if the use of a tripod is recognized, the ISO is reduced as much as possible to minimize noise to properly capture a fireworks image. Also, image quality processing is performed variously based on the number of windows and histogram reference values obtained in the firework recognition. Since image quality processing in the firework recognition mode is described above in detail, description thereof will be omitted.

As described above, according to the present invention, as a firework is automatically recognized, the user does not have to switch to a photographing mode or change a predetermined setup value of the digital image processing apparatus. A setup value of the digital image processing apparatus is automatically adjusted to support a photographing condition so that the firework is properly photographed.

Instead of a passive photographing operation of a scene recognition mode according to the conventional art, a photographing operation is actively conducted such that a setup value is automatically adjusted according to the size or luminance of fireworks, thereby obtaining a good quality image.

The elements of the embodiments of the present invention may be configured using hardware, software, or a combination of hardware and software. For example, the elements may be configured using executable computer codes programmed to operate each element when executed in the DSP 180 and stored in the program storing unit 140.

The method of operating the digital image processing apparatus, according to the embodiments of the present invention, can be written as computer code in a computer readable storage medium. Examples of the computer readable storage medium include all kinds of storage devices in which data that is computer readable by a computer system is stored.

The computer readable code may be configured to perform operations of controlling the digital photographing apparatus according to the present invention when the DSP 180 reads the computer readable code from the computer readable storage medium to execute the computer readable code. The computer readable code may be implemented using various programming languages. Also, functional programs, code, and code segments for accomplishing the present invention can be easily construed by programmers of ordinary skill in the art to which the present invention pertains.

Examples of the computer readable storage medium include read-only memory (ROM), random-access memory (RAM), CD-ROMs, magnetic tapes, floppy disks, optical data storage devices, and the like. The computer readable storage medium can also be distributed over network coupled computer systems so that the computer readable code is stored and executed in a distributed fashion.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. A digital image processing apparatus comprising a digital signal processor that recognizes a firework without manipulation by a user based on data regarding luminance and size of flames of the firework of a live view image including at least two consecutively input frames, and that performs image quality processing on the live view image in accordance with whether a firework is recognized;
wherein the digital signal processor comprises:
a histogram calculation unit that calculates histograms of the live view image; and
a probability calculation unit that calculates a probability that the live view image is a fireworks image based on variations of the calculated histograms; and
wherein the digital signal processor recognizes the firework based on a pattern of distribution of probabilities of the firework according to time flow during predetermined periods, each of the probabilities for the firework being calculated from frames obtained during successive periods of time.

2. The digital image processing apparatus of claim 1, wherein the digital signal processor displays a user interface that is displayed variously according to luminance and size of the flames based on a result of recognizing a firework.

3. The digital image processing apparatus of claim 1, wherein the digital signal processor comprises:
a window setting unit that sets windows on predetermined portions of the live view image corresponding to a reference luminance or greater, and generates position data and luminance data of the set windows;
a pattern recognition unit that recognizes a pattern by determining whether a distribution of the calculated probability is similar to a pattern obtained by photographing a fireworks display; and
a control unit that determines a firework recognition mode based on a result of recognizing the pattern, and performs image quality processing on the fireworks image according to whether the use of a tripod is recognized or not;
and wherein the histogram calculation unit calculates the histograms of the live view image based on the position data and luminance data of the set windows.

4. The digital image processing apparatus of claim 3, further comprising a memory that stores luminance data and position data of the set windows, the calculated histograms, and a reference pattern that is a reference for recognizing the firework.

5. The digital image processing apparatus of claim 4, wherein the window setting unit comprises:
a calculation unit that calculates a total luminance based on luminance data of a first frame, and sets a reference luminance corresponding to a predetermined distribution of the calculated total luminance; and
a setting unit that sets windows by dividing pixels into blocks corresponding to the reference luminance or greater with respect to subsequent frames after the first frame.

6. The digital image processing apparatus of claim 5, wherein the histogram calculation unit comprises:
a calculation unit that calculates sums of histograms of luminance of pixels in blocks that correspond to a reference value or greater among total frames corresponding to positions of the windows of the first frame; and
a smoothing unit that smoothes each of the frames with a size corresponding to a difference between a maximum value and a minimum value of the calculated sums of the histograms of the luminance.

7. The digital image processing apparatus of claim 6, wherein the probability calculation unit comprises:
a setting unit that sets a reference variation for determining a variation based on sums of the histograms of the first frame;
a first calculation unit that calculates variations of the sums of the histograms between adjacent frames of the total frames; and
a second calculation unit that calculates the calculated variations that are the same as or greater than the reference variation for each of the windows as a probability.

8. The digital image processing apparatus of claim 7, wherein the pattern recognition unit comprises:
a providing unit that provides the reference pattern for recognizing the firework;
a generating unit that generates a pattern based on the calculated probability; and
a comparing unit that compares the generated pattern with the reference pattern.

9. The digital image processing apparatus of claim 8, wherein when the use of a tripod is not recognized, the control unit performs image quality processing on the image that is recognized in a firework recognition mode when the reference pattern is similar to the generated pattern, by adjusting at least one of shutter speed and ISO.

10. The digital image processing apparatus of claim 9, wherein when the use of a tripod is recognized, the control unit performs image quality processing on the image that is recognized in a firework recognition mode, by adjusting at least one of the shutter speed and ISO by determining the luminance of flames based on number of windows and the sizes of flames based on the histograms.

11. A method of operating a digital image processing apparatus, the method comprising:
recognizing a fireworks image without manipulation by a user based on variations of luminance and sizes of flames of a live view image including at least two consecutively input frames; and
performing image quality processing on the image that is recognized as a fireworks image;
wherein recognizing the fireworks image comprises:
calculating histograms of the live view image;
calculating a probability that the live view image is a fireworks image based on variations of the calculated histograms; and
recognizing the firework based on a pattern of distribution of probabilities of the firework according to time flow during predetermined periods, each of the probabilities for the firework being calculated from frames obtained during successive periods of time.

12. The method of claim 11, wherein recognizing the fireworks image comprises:
(a) setting windows to predetermined portions of the live view image corresponding to a reference luminance or greater and generating position data and luminance data of the set windows;
(b) calculating the histograms of the live view image based on the position data and luminance data of the set windows and
determining whether a distribution of the calculated probability is similar to a pattern that is obtained by photographing a firework.

13. The method of claim 12, wherein performing image quality processing comprises:

determining whether a tripod is used or not;

if the use of a tripod is not recognized, performing image processing with a previously set shutter speed and ISO; and if the use of a tripod is recognized, determining luminance of flames based on a number of the windows, determining a size of the flames based on the histograms, and adjusting at least one of the shutter speed and ISO to perform image quality processing.

14. The method of claim 12, wherein (a) setting windows comprises:

(a-1) calculating a total luminance based on luminance data of a first frame, and setting a reference luminance corresponding to a predetermined distribution of the calculated total luminance; and (a-2) setting windows by dividing pixels into blocks corresponding to the reference luminance or greater with respect to subsequent frames after the first frame.

15. The method of claim 14, wherein (b) calculating histograms comprises:

(b-1) calculating sums of histograms of luminance of pixels in blocks that correspond to a reference value or greater among total frames corresponding to positions of windows of the first frame; and (b-2) smoothing each of the frames with a size corresponding to a difference between a maximum value and a minimum value of the calculated histograms of the luminance.

16. The method of claim 15, wherein (c) calculating a probability comprises:

(c-1) setting a reference for determining a variation based on sums of the histograms of the first frame;

(c-2) calculating variations of the sums of the histograms between adjacent frames of the total frames; and (c-3) calculating the calculated variations that are the same as or greater than a reference for each of the windows, as a probability.

17. The method of claim 16, wherein determining comprises:

(d-1) providing a reference pattern for recognizing the firework;

(d-2) generating a pattern based on the calculated probability; and (d-3) comparing the generated pattern with the reference pattern.

18. A computer-readable non-transitory storage medium having stored thereon a program executable by a processor for performing a method comprising:

recognizing a firework without manipulation by a user based on variations of luminance and sizes of flames of a live view image including at least two consecutively input frames, and performing image quality processing on the live view image in accordance with whether a firework is recognized;

wherein recognizing the fireworks image comprises:

calculating histograms of the live view image;

calculating a probability that the live view image is a fireworks image based on variations of the calculated histograms; and recognizing the firework based on a pattern of distribution of probabilities of the firework according to time flow during predetermined periods, each of the probabilities for the firework being calculated from frames obtained during successive periods of time.

19. The computer-readable non-transitory storage medium of claim 18, wherein the method further comprises:

setting windows on predetermined portions of the live view image corresponding to a reference luminance or greater and generating position data and luminance data of the set windows;

calculating the histograms of the live view image based on the position data and luminance data of the set windows;

recognizing a pattern by determining whether a distribution of the calculated probability is similar to a pattern obtained by photographing a fireworks display; and determining a firework recognition mode based on a result of recognizing the pattern, and performing image quality processing on the image according to whether the use of a tripod is recognized or not.

* * * * *